Sept. 25, 1956  H. G. PARKE  2,764,737

PEAK VOLTAGE METER

Filed June 13, 1952

*Harry G. Parke*
INVENTOR.

2,764,737
PEAK VOLTAGE METER

Harry G. Parke, Brooklyn, N. Y.

Application June 13, 1952, Serial No. 293,416

7 Claims. (Cl. 324—103)

This invention is an improvement in voltage measuring devices and consists of a means for indicating the maximum absolute voltage present between two conductors during the period the meter is connected.

The insulation required on an electrical system is a function principally of the maximum voltage present in the system. Frequently this voltage appears in sharp spikes which, because of their low duty cycle, barely affect the readings of R. M. S., D. C. or averaging meters. Oscillographic methods, while excellent, have disadvantages as regards portability and simplicity. My invention provides a simple means suitable for use in a portable instrument for indicating the maximum voltage that has been applied between its terminals, regardless of polarity and whether the maximum voltage was constant, repetitive, or a single peak. It is a secondary object of my invention to indicate the peak voltage retaining polarity information for cases where this may be desirable.

Figure 1:
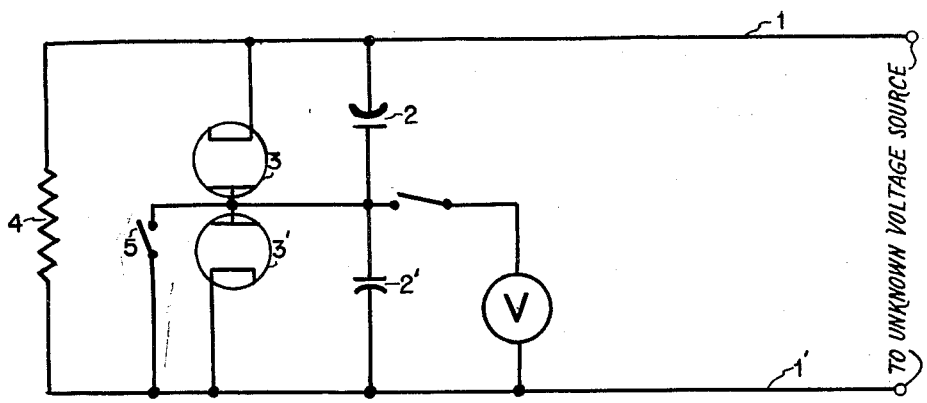

My invention may be best understood by reference to the drawings. Figure 1 shows the basic invention while Figure 2 shows an improvement suitable for use as a portable instrument.

Referring to Figure 1—1, 1' are conductors connecting to the points between which the voltage is to be measured; 2, 2' are equal capacitors; 3, 3' are unidirectional conductors shown here as diodes. Should conductor 1 go positive with respect to conductor 1', condenser 2 would charge through diode 3' to the full voltage. If conductor 1' went positive with respect to 1, condenser 2 would charge through diode 3. In either case when the voltage dropped to zero or when conductors 1, 1' were removed from the voltage source the charge would drive equally between the two condensers causing their common terminal to have a negative potential equal to one half the peak voltage applied. It will be readily seen that any future voltage differences applied across 1, 1' will have no effect on the charge stored at the condenser junction, unless its value exceeds the previous peak, whereupon one condenser will be shorted out and the other charged to the new peak.

When the instrument is removed from the voltage source, and after the condensers have equalized their charges through resistor 4, the voltage present at the condensers junction will be one half the peak value present between the conductors being measured. This voltage may be read from the electrostatic voltmeter V which may be calibrated directly in peak voltage.

Figure 2:
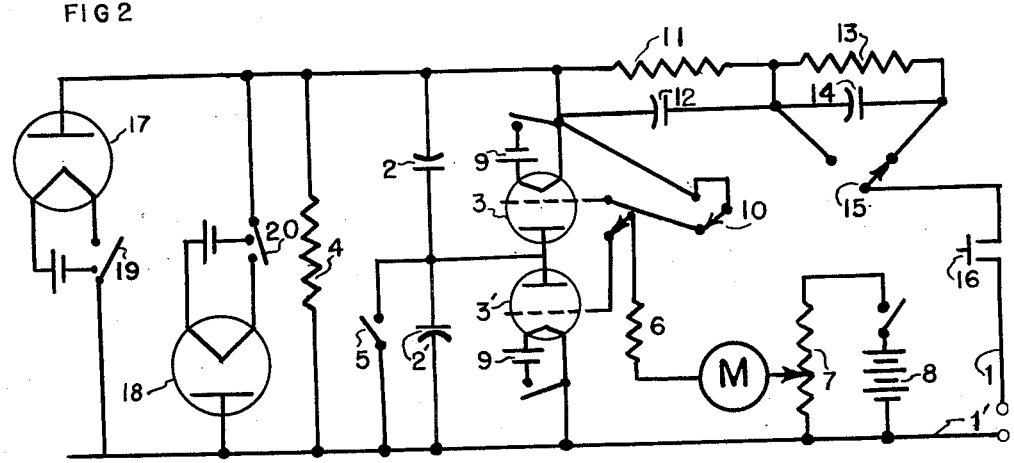

Referring now to Figure 2 which shows a form of my invention incorporating a number of improvements especially adaptable to a portable instrument.

Diodes 3 and 3' have been replaced by triodes. For measurements the grid of 3 is connected to its cathode while the grid of 3' is connected through resistor 6 and current meter M to a positive voltage from battery 8 and potentiometer 7. Under these conditions, tube 3' is acting as an inverse triode as well as a unidirectional conductor, and the decrease in grid current from the zero plate voltage value is directly proportional to the plate voltage. Consequently meter M may be calibrated directly in peak volts. It is especially convenient to use a backward reading current meter for this application, since then the voltage scale appears normal. Since the amplification factor of an inverse triode changes rapidly near cutoff, it is convenient to extend the scale only to 80% of zero current or to use an offset zero meter.

In order to readily determine the conditions of tube 3 and battery 9, switch 10 may be used to switch the meter into the grid circuit of 3, thereby checking filament emission and battery life.

Since the impedance of the device shown in Figure 1 is effectively resistor 4 shunted by capacitor 2 (or equal capacitor 2') for either polarity it may be used with series impedances to increase the range without introducing frequency errors provided that the series impedances consist of parallel RC combinations with an RC product equal to that of 2, 4. In Figure 2 these RC circuits are shown by 11, 12 and 13, 14. Since for high input impedance inverted triodes should be operated at fairly low plate voltages, it is convenient to have 11, 12 continuously in the circuit.

Since the circuit of Figure 1 will indicate a constant voltage at twice its true value until removed from the voltage source it is desirable to have an internal means for separating the instrument from the voltage being measured. This may be done by a switch located at 16, closed to measure, open to read.

Finally for cases where it is desirable to know the peak of each polarity diodes 17 or 18 may be switched in by switches 19 or 20 thereby shorting out signals of the other polarity. This technique has the great advantage over using tube 3' alone and reversing leads that lead 1' which connects to the meter, B battery etc. may be always connected to the low terminal of the source.

I do not desire that my invention be restricted only to the exact construction shown in the drawings since many modifications are possible without departing from the spirit of my invention. I therefore ask that only such restrictions be placed on my invention as are contained in the following claims.

I claim:

1. A peak voltage measuring device comprising a pair of first conductors adapted to be connected to the source of voltage to be measured, a pair of unidirectional conductors connected in series between said first conductors, said unidirectional conductors being connected with their directions of conduction in opposition, a pair of substantially equal capacitors connected in series between said first conductors, a resistor connected between said first conductors, means for measuring the voltage across one of said capacitors, and means interconnecting the junction point of said unidirectional conductors with the junction point of said capacitors, said junction point of said capacitors being otherwise conductively isolated from the ends of said capacitors remote from said last-mentioned junction point.

2. A peak voltage measuring device comprising a pair of first conductors adapted to be connected to the source of voltage to be measured, a pair of unidirectional conductors connected in series between said first conductors, said unidirectional conductors being connected with their directions of conduction in opposition, a pair of substantially equal capacitors connected in series between said first conductors, a resistor connected between said first conductors, non-conductive means for measuring the voltage across one of said capacitors, switching means connected in parallel with one of said capacitors for discharging said capacitors, and means interconnecting the junction point of said unidirectional conductors with the junction point of said capacitors, said junction point of said capacitors being otherwise conductively isolated from the ends of said capacitors remote from said last-mentioned junction point.

3. A peak voltage measuring device comprising a first unidirectional conductor having anode and cathode electrodes, a second unidirectional conductor having anode and cathode electrodes and a control electrode, means connecting one of said anode and cathode electrodes of said first conductor to the corresponding one of said anode and cathode electrodes of said second conductor, a resistor connected between the other electrode of said first conductor and the other of said anode and cathode electrodes of said second conductor, a pair of substantially equal capacitors connected in series, means respectively connecting the ends of said capacitors remote from their junction point to said other electrodes, one said end being connected to one said other electrode, means connecting said junction point of said capacitors to said one electrode of said first conductor, said junction point being otherwise conductively isolated from said ends of said capacitors, a voltage source, means connecting the negative end of said source to said cathode electrode of said second conductor, means connecting a positive potential point on said source and said control electrode, one of said two last-mentioned means including current measuring means, and means for connecting said other electrodes to a source of voltage to be measured.

4. A peak voltage measuring device comprising a first unidirectional conductor having anode and cathode electrodes, a second unidirectional conductor having anode and cathode electrodes and a control electrode, means connecting one of said anode and cathode electrodes of said first conductor to the corresponding one of said anode and cathode electrodes of said second conductor, a resistor connected between the other electrode of said first conductor and the other of said anode and cathode electrodes of said second conductor, a pair of substantially equal capacitors connected in series, means respectively connecting the ends of said capacitors remote from their junction point directly to said other electrodes, one said end being connected to one said other electrode, means connecting said junction point of said capacitors to said one electrode of said first conductor, said junction point being otherwise conductively isolated from said ends of said capacitors, a voltage source, means connecting the negative end of said source to said cathode electrode of said second conductor, current measuring means connected between a positive potential point on said source and said control electrode, selectively operable switching means connected in parallel with one of said capacitors for discharging said capacitors, means for connecting said other electrodes to a source of voltage to be measured comprising a further resistor and a further capacitor connected in parallel and connected at one end to one of said other electrodes and adapted to be connected at the other end of said last-mentioned source, the product of the values of said further resistor and said further capacitor being substantially equal to the product of the values of said first-mentioned resistor and one of said pair of capacitors, and switching means connected in series with one of said other electrodes for alternatively connecting and disconnecting said device to and from said source of voltage to be measured, third and fourth unidirectional conductors and means for selectively connecting said third and fourth conductors in oppositely conducting directions between said other electrodes.

5. A peak voltage measuring device comprising a diode having anode and cathode electrodes, a triode having anode and cathode electrodes and a control electrode, means connecting said anode electrode of said diode to said anode electrode of said triode, a resistor connected between said cathode electrodes, a pair of substantially equal capacitors connected in series, means respectively connecting the ends of said capacitors remote from their junction point to said cathode electrodes, one said end being connected to one said cathode electrode, means connecting said junction point of said capacitors to said anode electrodes, said junction point being otherwise conductively isolated from said ends of said capacitors, a voltage source, means connecting the negative end of said source to said cathode electrode of said triode, current measuring means connected between a positive potential point on said source and said control electrode, selectively operable switching means connected in parallel with one of said capacitors for discharging said capacitors, means for connecting said cathode electrodes to a source of voltage to be measured comprising a further resistor and a further capacitor connected in parallel and connected at one end to one of said cathode electrodes and adapted to be connected at the other end to said last-mentioned source, the product of the values of said further resistor and said further capacitor being substantially equal to the product of the values of said first-mentioned resistor and one of said pair of capacitors, and switching means connected in series with one of said cathode electrodes for alternatively connecting and disconnecting said device to and from said source of voltage to be measured, third and fourth unidirectional conductors and means for selectively connecting said third and fourth conductors in oppositely conducting directions between said cathode electrodes.

6. A peak voltage measuring device comprising a pair of first conductors adapted to be connected to the source of voltage to be measured, a pair of unidirectional conductors connected in series between said first conductors, said unidirectional conductors being connected with their directions of conduction in opposition, a pair of substantially equal capacitors connected in series between said first conductors, a resistor connected between said first conductors, means for measuring the voltage across one of said capacitors, means interconnecting the junction point of said unidirectional conductors with the junction point of said capacitors, and means connecting the ends of said capacitors remote from the junction point thereof directly to the ends of said unidirectional conductors remote from the junction point thereof.

7. A peak voltage measuring device comprising a pair of first conductors adapted to be connected to the source of voltage being measured, a resistor conductively connected between said first conductors, a capacitor connected at one terminal to one of said first conductors, a unidirectional conductor having anode, cathode and control electrodes, means for connecting one of said anode and cathode electrodes to the opposite terminal of said capacitor, said terminals of said capacitor being otherwise conductively isolated from each other for the polarity of charge produced on said capacitor by conduction through said unidirectional conductor means for connecting the other of said anode and cathode electrodes to the other of said first conductors, a power supply having positive and negative terminals, means connecting the negative terminal of said supply to said cathode electrode, and a current measuring device connected between said positive terminal and said control electrode.

References Cited in the file of this patent

UNITED STATES PATENTS

| | | |
|---|---|---|
| 1,611,716 | Brown | Dec. 21, 1926 |
| 1,784,119 | Terman | Dec. 9, 1930 |
| 2,350,545 | Bradford | June 6, 1944 |
| 2,405,133 | Brown | Aug. 6, 1946 |
| 2,418,284 | Winchel | Apr. 1, 1947 |
| 2,511,645 | Mahoney | June 13, 1950 |
| 2,586,803 | Fleming | Feb. 26, 1952 |

OTHER REFERENCES

Journal of Scientfic Instruments (Br.), vol. XV, 1938, p. 136. (In Div. 69, Class 171–95–22B.)